US012449117B1

(12) United States Patent
Lin

(10) Patent No.: US 12,449,117 B1
(45) Date of Patent: Oct. 21, 2025

(54) TREE LAMP

(71) Applicant: Fangfang Lin, Zhejiang Province (CN)

(72) Inventor: Fangfang Lin, Zhejiang Province (CN)

( * ) Notice: Subject to any disclaimer, the term of this patent is extended or adjusted under 35 U.S.C. 154(b) by 0 days.

(21) Appl. No.: 18/778,270

(22) Filed: Jul. 19, 2024

(30) Foreign Application Priority Data

Jul. 11, 2024 (CN) ......................... 202421642542.4

(51) Int. Cl.
*F21V 23/06* (2006.01)
*F21W 121/00* (2006.01)

(52) U.S. Cl.
CPC ......... *F21V 23/06* (2013.01); *F21W 2121/00* (2013.01)

(58) Field of Classification Search
CPC ............................ F21V 23/06; F21W 2121/00
See application file for complete search history.

(56) References Cited

U.S. PATENT DOCUMENTS

2022/0154910 A1* 5/2022 Trice ......................... F21V 3/06

FOREIGN PATENT DOCUMENTS

CN 210165295 U * 3/2020
CN 215411528 U * 1/2022

OTHER PUBLICATIONS

English translation of Weng CN-215411528-U (Year: 2022).*
English translation of Chen CN-210165295-U (Year: 2020).*

* cited by examiner

*Primary Examiner* — Evan P Dzierzynski

(57) ABSTRACT

Provided in the present application is a tree lamp. The tree lamp includes a lamp housing, a light-emitting body and a base, where the lamp housing is configured to have a tree shape, a mounting portion is formed at a lower end of the lamp housing, and the lower end of the lamp housing is further provided with power connection contacts; the light-emitting body is provided on the lamp housing, and the light-emitting body is electrically connected to the power connection contacts; a power supply unit is provided inside the base, a mounting recess is formed in a top surface of the base, electrically-conductive structures are provided inside the mounting recess, and the electrically-conductive structures are electrically connected to the power supply unit; and each of the power connection contacts or each of the electrically-conductive structures includes an elastic member.

16 Claims, 12 Drawing Sheets

TREE LAMP

CROSS-REFERENCE TO RELATED APPLICATIONS

The application claims priority of Chinese patent application CN2024216425424, filed on Jul. 11, 2024, which is incorporated herein by reference in its entireties.

TECHNICAL FIELD

The present application relates to the field of lamps, in particular to a tree lamp.

BACKGROUND

A tree lamp, as a decorative lamp simulating the shape of a tree, can provide illumination and also have a high ornamental value. Thus, the tree lamp can be widely applied in various places such as squares, courtyards, hotel lobbies, living rooms or bedrooms. The tree lamp generally includes an upper tree-shaped lamp housing and a bottom base, where the lamp housing is provided with a light-emitting body, and the base is provided with a battery for supply power to the light-emitting body.

According to the tree lamp in the related technologies, the lamp housing is provided with a power connection contact electrically connected to the light-emitting body, the base is provided with a power connection structure electrically connected to the battery, and when the lamp housing is mounted on the base, the power connection contact is in contact with the power connection structure for electrifying, so that the battery can supply power to the light-emitting body.

However, the lamp housing is usually mounted on the base in a threaded connection manner, so that when a joint of the lamp housing and the base is slightly loosened, the contact between the power connection contact of the lamp housing and the power connection structure of the base is removed, the power supplied by the base to the light-emitting body is not stable, and the light-emitting body on the lamp housing will flicker or be turned off, affecting the illumination effect.

SUMMARY

On this basis, it is necessary to provide a tree lamp to solve at least one of the above problems.

The present application provides a tree lamp, comprising:

a lamp housing, where the lamp housing is configured to have a tree shape, a mounting portion is formed at a lower end of the lamp housing, and the lower end of the lamp housing is further provided with power connection contacts;

a light-emitting body, where the light-emitting body is provided on the lamp housing, and the light-emitting body is electrically connected to the power connection contacts; and a base, where a power supply unit is provided inside the base, a mounting recess is formed in a top surface of the base, electrically-conductive structures are provided inside the mounting recess, and the electrically-conductive structures are electrically connected to the power supply unit; and each of the power connection contacts or each of the electrically-conductive structures comprises an elastic member, when the mounting portion is mounted in the mounting recess, the power connection contacts are in contact with the electrically-conductive structures, and the elastic members are compressed.

Optionally, each of the electrically-conductive structures comprises the elastic member, and the elastic member is provided on a bottom wall of the mounting recess and is electrically connected to the power supply unit.

Optionally, there are two elastic members, and distances between the two elastic members and the center of the mounting recess are equal; and there are two power connection contacts, and positions of the power connection contacts are fitted with positions of the elastic members.

Optionally, the lamp housing comprises a housing body, the mounting portion is provided at a lower end of the housing body, and the power connection contacts are provided in an inner cavity of the mounting portion; and each of the power connection contacts comprises contact pins and the elastic member, one end of each of the contact pins is exposed out of the mounting portion, and two opposite ends of the elastic member are respectively connected to the contact pins and the mounting portion.

Optionally, there are two contact pins, one of the two contact pins is located at the center of the mounting portion, and the other one deviates from the center of the mounting portion; and each of the electrically-conductive structures comprises a first electrically-conductive sheet and a second electrically-conductive sheet, the first electrically-conductive sheet and the second electrically-conductive sheet are configured to be in contact with the different contact pins, the first electrically-conductive sheet is a round electrically-conductive sheet, the second electrically-conductive sheet is an annular electrically-conductive sheet and surrounds the first electrically-conductive sheet, and there is a gap between the first electrically-conductive sheet and the second electrically-conductive sheet.

Optionally, the mounting portion is of a sleeve structure, and the sleeve structure is detachably sleeved at the lower end of the housing body.

Optionally, the sleeve structure comprises a sleeve body and a sleeve cover, the sleeve cover is detachably connected to the sleeve body, and the sleeve cover and the sleeve body enclose the inner cavity of the mounting portion.

Optionally, the mounting portion is detachably connected to the mounting recess.

Optionally, first protrusions are formed on an inner wall of the mounting recess, and limiting grooves fitted with the first protrusions are formed in an outer wall of the mounting portion; and the mounting portion is capable of being inserted into the mounting recess, and at least parts of the first protrusions are embedded in the limiting grooves.

Optionally, there are two first protrusions, and the two first protrusions are respectively located on two opposite sides of the mounting portion; and there are two limiting grooves.

Optionally, snap-fitting grooves are formed in an outer wall of the mounting portion, and snap-fitting blocks fitted with the snap-fitting grooves are formed in an inner wall of the mounting recess; and the mounting portion is capable of being inserted into the mounting recess, and at least parts of the snap-fitting blocks are embedded in the snap-fitting grooves.

Optionally, there are two snap-fitting blocks, and the two snap-fitting blocks are respectively located on two opposite sides of the mounting recess; and there are two snap-fitting grooves.

Optionally, each of the snap-fitting blocks comprises a fixed end and a rotating end which are opposite to each other, and the fixed end is connected to the inner wall of the mounting recess; the base is provided with avoiding spaces for the rotating ends to rotate, and each of the avoiding spaces is located on one side of the snap-fitting block away from the mounting recess; and in a process of mounting the mounting portion in the mounting recess, the bottom of the mounting portion extrudes the rotating ends to enable the rotating ends to be elastically deformed and rotate in a direction away from the mounting portion, the mounting portion is continuously inserted into the mounting recess until the rotating ends are aligned to the snap-fitting grooves, and at least parts of the rotating ends are embedded in the snap-fitting grooves.

Optionally, an outer wall of the mounting portion is provided with a second protrusion, a guide groove fitted with the second protrusion is formed in an inner wall of the mounting recess, and an opening of the guide groove is in communication with the top surface of the base.

Optionally, there are one second protrusion and one guide groove.

Optionally, cambered surfaces are formed at the bottom of the mounting portion, an acute angle is formed between a tangent of each of the cambered surfaces and an axis of the mounting portion, and a distance between each of the cambered surfaces and the axis of the mounting portion gradually decreases in a mounting direction of the mounting portion.

Optionally, there are two cambered surfaces, and the two cambered surfaces are respectively located on two opposite sides of the mounting portion.

Optionally, each of the elastic members is a spring.

Optionally, the power supply unit comprises a battery and a circuit board, and the electrically-conductive structures and the battery are electrically connected to the circuit board.

Optionally, the base comprises an upper housing and a lower cover plate, the lower cover plate is detachably connected to the upper housing, the upper housing and the lower cover plate enclose a mounting cavity, and the power supply unit is located in the mounting cavity.

It can be seen from the above technical solutions that the embodiments of the present application at least have the following advantages and positive effects:

according to the tree lamp, the power connection contacts or the electrically-conductive structures are provided with the elastic members, and when the lamp housing is mounted on the base, the power connection contacts are in contact with the electrically-conductive structures to achieve electrical connection between the power supply unit and the light-emitting body; and then the elastic members are in a compressed state, when the connection between the lamp housing and the base is slightly loosened, gaps appear or tend to appear between the power connection contacts and the electrically-conductive structures, the elastic members release elastic forces to enable the power connection contacts and the electrically-conductive structures to maintain in a state of abutting against each other, and the electrical connection between the power supply unit and the light-emitting body is more stable.

BRIEF DESCRIPTION OF DRAWINGS

The accompanying drawings are only used for illustrative description and cannot be understood as limitations on the present patent. The same reference numerals are used for members with the same structures and the same functions. In the drawings.

DESCRIPTION OF REFERENCE NUMERALS

Figure 1:
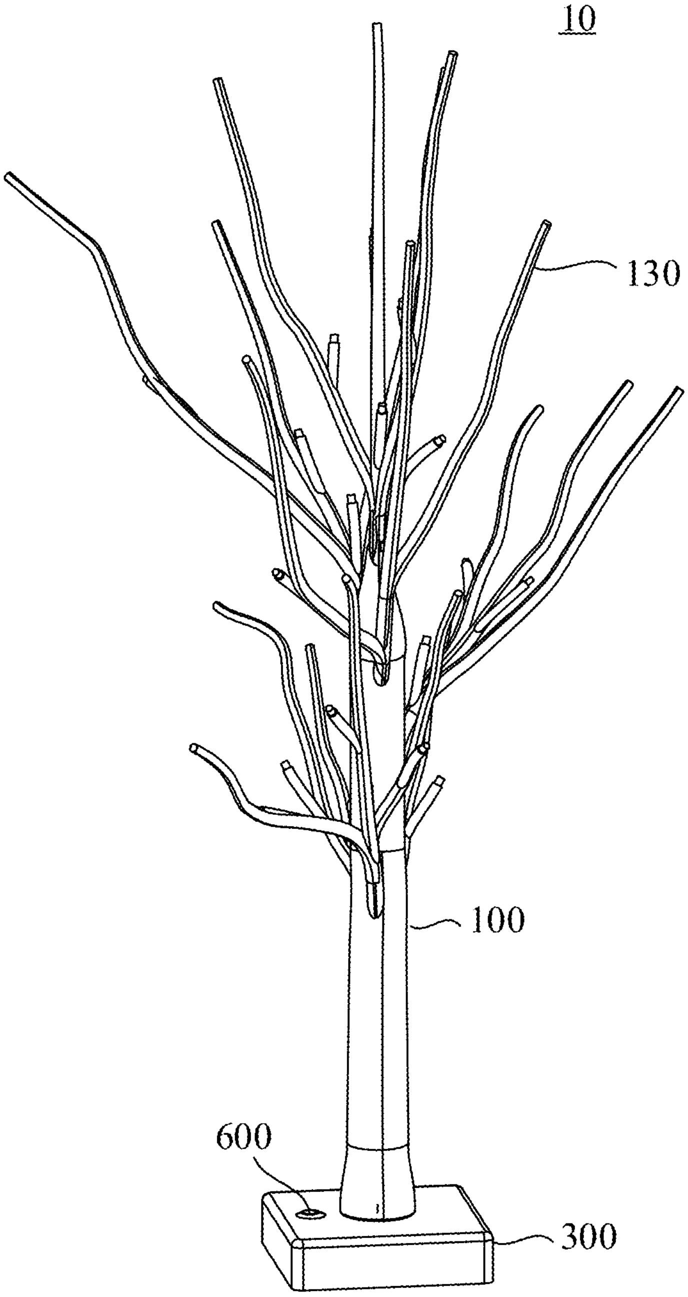
FIG. 1 is an overall structural schematic diagram of a tree lamp in an embodiment of the present application.

10. tree lamp;

100. lamp housing; 101. housing body; 110. mounting portion; 111. limiting groove; 112. snap-fitting groove; 113. sleeve structure; 1131. sleeve body; 1132. sleeve cover; 114. second protrusion; 115. cambered surface; 120. power connection contact; 121. contact pin; 130. simulated branch;

200. light-emitting body;

300. base; 310. mounting recess; 311. first protrusion; 312. snap-fitting block; 3121. fixed end; 3122. rotating end; 313. electrically-conductive structure; 3131. first electrically-conductive sheet; 3132. second electrically-conductive sheet; 314. guide groove; 320. power supply unit; 321. battery; 322. circuit board; 330. avoiding space; 340. upper housing; 350. lower cover plate;

400. elastic member;

500. wire; and

600. control switch.

DETAILED DESCRIPTION OF THE EMBODIMENTS

The technical solutions in embodiments of the present application will be described below in conjunction with the accompanying drawings in the embodiments of the present application. In the description of the embodiments of the present application, unless otherwise specified, "/" indicates the meaning of "or", for example, A/B may indicate A or B; and the term "and/or" herein is only intended to describe association relationships of associated objects, and indicates that there may be three relationships, for example, the expression of "A and/or B" may indicate the following three conditions: A exists separately, A and B exist at the same time, and B exists separately. In addition, in the description of the embodiments of the present application, "a plurality of" means two or more.

Hereinafter, the terms "first" and "second" are only for the purpose of describing, and cannot be understood as indicating or implying the relative importance or implicitly indicating the number of technical features indicated. Thus, the features defined as "first" and "second" may explicitly or implicitly include one or more such features.

In the description of this embodiment, unless otherwise specified, "a plurality of" means two or more. The above content is only the particular embodiments of the present application, but the scope of protection of the present application is not limited to these embodiments. Any modification or replacement within the scope of technologies disclosed in the present application should be included in the scope of protection of the present application. Therefore, the scope of protection of the present application should be subject to the scope of protection of the claims.

As mentioned in the background, the tree lamp in the related technologies includes the upper lamp housing and the bottom base, a lamp is provided on the lamp housing, a power supply unit is provided in the base, and the power connection contact of the lamp housing is in contact with an electrically-conductive structure of a lamp holder, so that the power supply unit can supply power to the LED lamp. When the contact between the power connection contact of the lamp housing and the electrically-conductive structure of the base is loosened, the light-emitting body on the lamp housing will flicker or be turned off, affecting the illumination effect.

On this basis, the present application provides a tree lamp 10, so as to improve the stability of electrical connection between a lamp housing 100 and a base 300.

Figure 2:
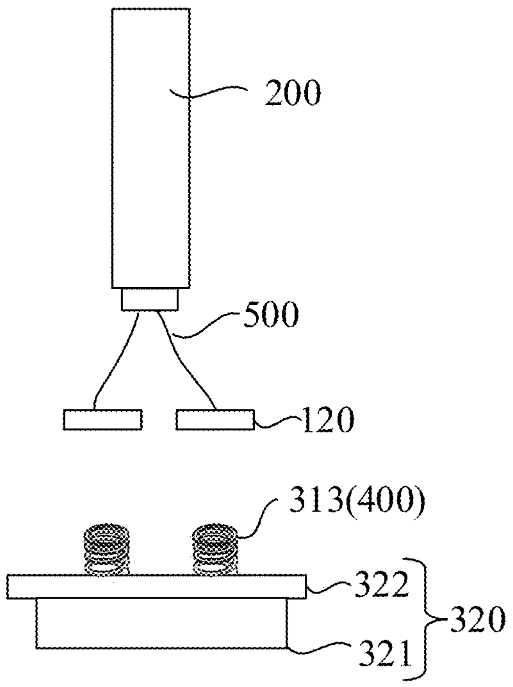
FIG. 2 is a schematic diagram of electrical connection of a tree lamp in an embodiment of the present application.
Figure 3:
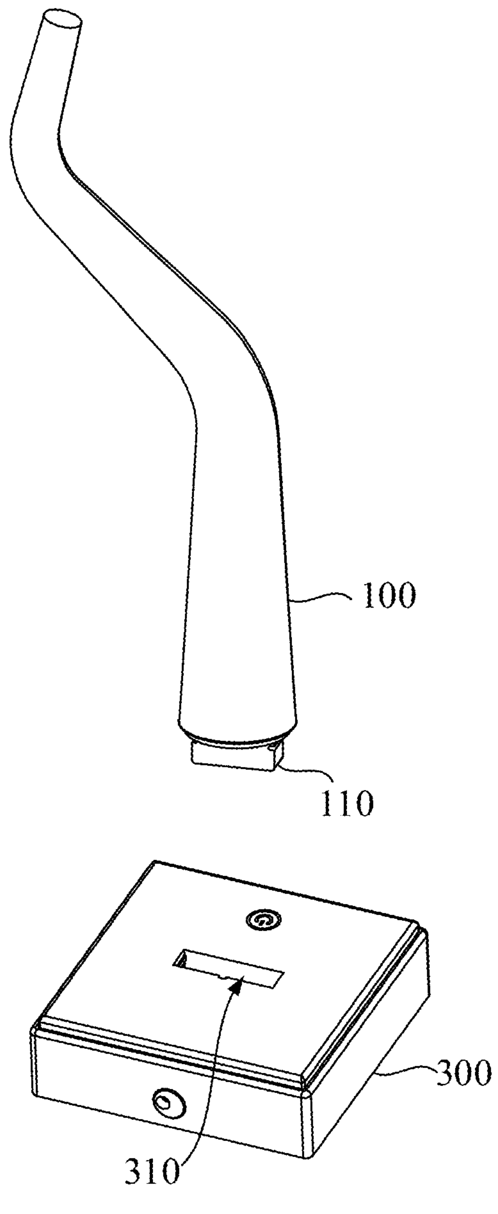
FIG. 3 is a state diagram of a lamp housing of the tree lamp as shown in FIG. 2 detached from a base.

Reference is made to FIG. 1 to FIG. 3, an embodiment of the present application provides the tree lamp 10, and the tree lamp 10 includes the lamp housing 100, a light-emitting body 200 and the base 300, where the lamp housing 100 is configured to have a tree shape, so that the lamp housing 100 can play a role in decoration; the light-emitting body 200 is provided on the lamp housing 100, and specifically, the light-emitting body 200 can be provided in an inner cavity of the lamp housing 100 or fixed to an outer surface of the lamp housing 100; and the lamp housing 100 is mounted on the base 300.

FIG. 2 and FIG. 3 show that a mounting portion 110 and power connection contacts 120 are formed at a lower end of the lamp housing 100, the light-emitting body 200 is electrically connected to the power connection contacts 120, a mounting recess 310 is formed in a top surface of the base 300, electrically-conductive structures 313 are provided in the mounting recess 310, a power supply unit 320 is provided inside the base 300, and the electrically-conductive structures 313 are electrically connected to the power supply unit 320. Each of the power connection contacts 120 or each of the electrically-conductive structures 313 includes an elastic member 400, when the mounting portion 110 is mounted in the mounting recess 310, the power connection contacts 120 are in contact with the electrically-conductive structures 313, and the elastic members 400 are compressed.

It is understandable that according to the tree lamp 10 in the embodiment of the present application, the power connection contacts 120 or the electrically-conductive structures 313 are provided with the elastic members 400, and when the lamp housing 100 is mounted on the base 300, the power connection contacts 120 are in contact with the electrically-conductive structures 313 to achieve electrical connection between the power supply unit 320 and the light-emitting body 200; and then the elastic members 400 are in a compressed state, when the connection between the lamp housing 100 and the base 300 is slightly loosened, gaps appear or tend to appear between the power connection contacts 120 and the electrically-conductive structures 313, the elastic members 400 release elastic forces to enable the power connection contacts 120 and the electrically-conductive structures 313 to maintain in a state of abutting against each other, and the electrical connection between the power supply unit 320 and the light-emitting body 200 is more stable.

The light-emitting body 200 is an object that can emit light when being electrified, for example, an incandescent lamp and an LED lamp. The light-emitting body 200 can be electrically connected to the power connection contacts 120 by means of wires 500.

The power connection contacts 120 and the electrically-conductive structures 313 are made of conductors, and for cost considerations, the conductors can be relatively common metal conductors, for example, copper, aluminum and nickel.

Figure 4:
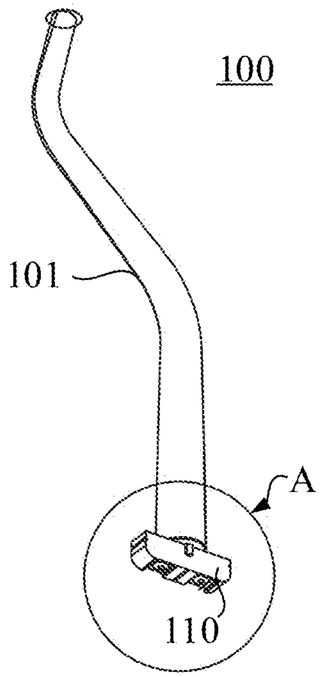
FIG. 4 is a structural schematic diagram of a lamp housing in an embodiment.
Figure 5:
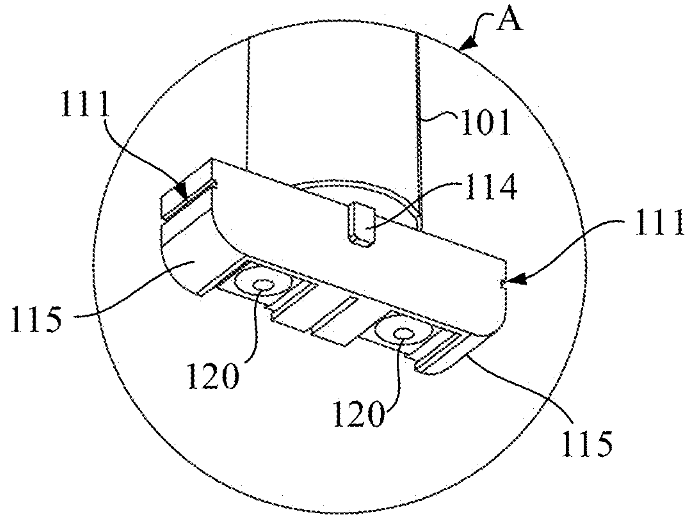
FIG. 5 is an enlarged view of area A of the lamp housing as shown in FIG. 4.
Figure 6:
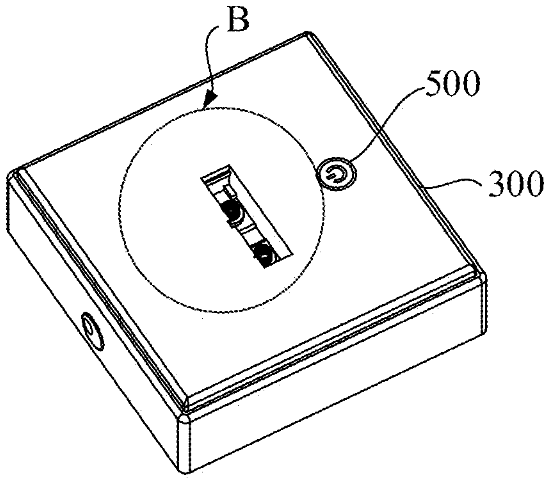
FIG. 6 is a structural schematic diagram of a base in the embodiment as shown in FIG. 4.
Figure 7:
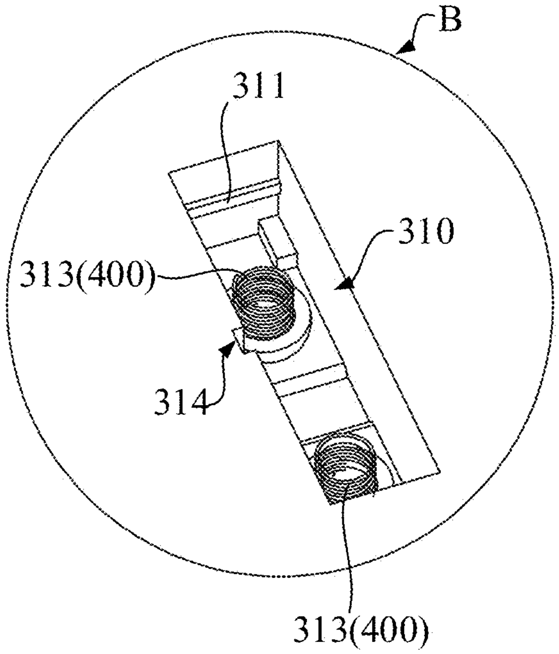
FIG. 7 is an enlarged view of area B of the base as shown in FIG. 6.
Figure 8:
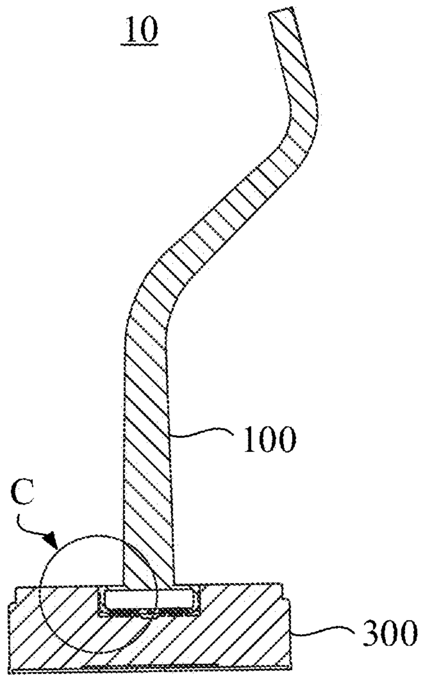
FIG. 8 is a sectional view of a tree lamp in the embodiment as shown in FIG. 4.
Figure 9:
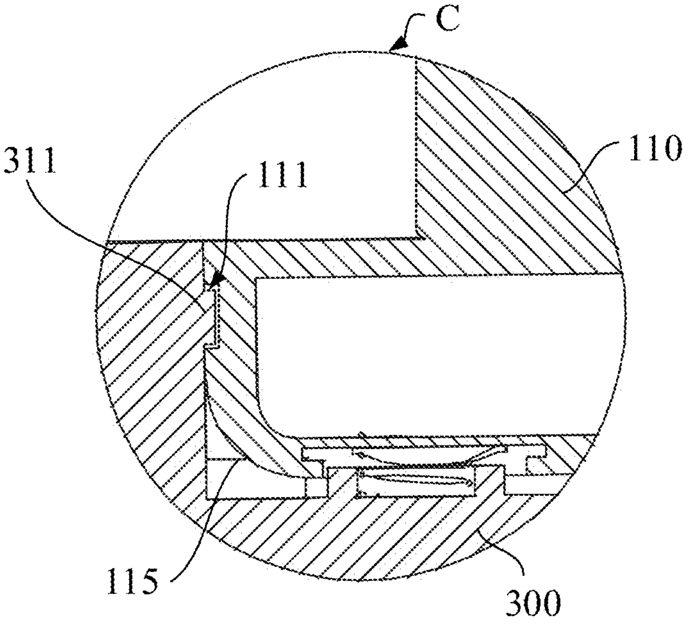
FIG. 9 is an enlarged view of area C in the sectional view as shown in FIG. 8.

Reference is made to FIG. 4 to FIG. 9, FIG. 4 is a structural schematic diagram of a lamp housing in an embodiment, FIG. 5 is an enlarged view of area A of the lamp housing as shown in FIG. 4, FIG. 6 is a structural schematic diagram of a base in the embodiment as shown in FIG. 4, FIG. 7 is an enlarged view of area B of the base as shown in FIG. 6, FIG. 8 is a sectional view of a tree lamp in the embodiment as shown in FIG. 4, and FIG. 9 is an enlarged view of area C in the sectional view as shown in FIG. 8.

In an embodiment, each of the electrically-conductive structures 313 includes the elastic member 400, and the elastic member 400 is provided on a bottom wall of the mounting recess 310 and is electrically connected to the power supply unit 320. FIG. 7 shows that the elastic members 400 are the electrically-conductive structures 313. It is understandable that in other embodiments, the elastic members 400 can serves as parts of the electrically-conductive structures 313, and a manufacturer can freely configure same according to requirements.

There are two elastic members 400, the two elastic members 400 are arranged at intervals, and distances between the two elastic members 400 and the center of the mounting recess 310 are equal; and there are two power connection contacts 120, and the two power connection contacts 120 correspond to the elastic members 400 on a one-to-one basis.

It is understandable that the elastic members 400 will accumulate elastic forces after being compressed and then will generate abutting forces to the mounting portion 110, so that providing the two elastic members 400 can improve the stress uniformity of the mounting portion 110, and can make the connection between the mounting portion 110 and the base 300 more stable. In addition, compared with providing only one elastic member 400 to be electrically connected to the power connection contacts 120, providing the two elastic members 400 to be correspondingly connected to the two power connection contacts 120 on a one-to-one basis can reduce the impedance, thereby reducing the energy consumption of the tree lamp 10.

Specifically, the lamp housing 100 can be made of a resin material, for example, thermosetting resin, so that the lamp housing 100 has the good hardness and the good high-temperature resistance, and is free from the phenomenon of melting due to heating. FIG. 1 shows that the lamp housing 100 can be provided with a plurality of simulated branches 130, so that the lamp housing 100 is similar to a tree in shape.

Specifically, reference is continuously made to FIG. 2 and FIG. 3, the mounting portion 110 is detachably connected in the mounting recess 310, so that the lamp housing 100 can be separated from the base 300; and when the lamp housing 100 is separated from the base 300, the power connection contacts 120 are also separated from the electrically-conductive structures 313, so that the lamp housing 100 and the base 300 can be completely separated without being restrained by the wires 500, and separate maintenance of the lamp housing 100 or the base 300 is facilitated.

Specifically, the mounting portion 110 can be detachably connected in the mounting recess 310 in a manner such as threaded connection, magnetically attracted connection, interference fit and snap-fitting. Of course, in some other embodiments, the lamp housing 100 can be connected to the base 300 in a nondetachable manner such as gluing or welding.

In an embodiment, reference is made to FIG. 4 to FIG. 9, first protrusions 311 are formed on an inner wall of the mounting recess 310, and limiting grooves 111 fitted with the first protrusions 311 are formed in an outer wall of the mounting portion 110. FIG. 8 and FIG. 9 show that the mounting portion 110 can be inserted into the mounting recess 310, and at least parts of the first protrusions 311 are embedded in the limiting grooves 111 to limit a housing to be separated from the base 300. When the lamp housing 100 needs to be detached from the base 300, a user can hold the lamp housing 100 to use a greater force to pull the mounting portion 110 out of the mounting recess 310, thereby separating the lamp housing 100 from the base 300. It is understandable that in other embodiments, positions of the first protrusions 311 and positions of the limiting grooves 111 can be exchanged, that is, the first protrusions 311 are provided on the outer wall of the mounting portion 110, and the corresponding limiting grooves 111 are provided in the inner wall of the mounting recess 310.

Specifically, there are two first protrusions 311, and the two first protrusions 311 are respectively located on two opposite sides of the mounting portion 110; and there are two limiting grooves 111, and the two limiting grooves 111 correspond to the two first protrusions 311 on a one-to-one basis. The protrusions are provided on the two opposite sides of the mounting portion 110 at the same time, so that the stress stability of the mounting portion 110 can be improved, the connection between the mounting portion 110 and the mounting recess 310 can be firmer, and loosening caused by warping of one side of the mounting portion 110 can be avoided.

Figure 10:
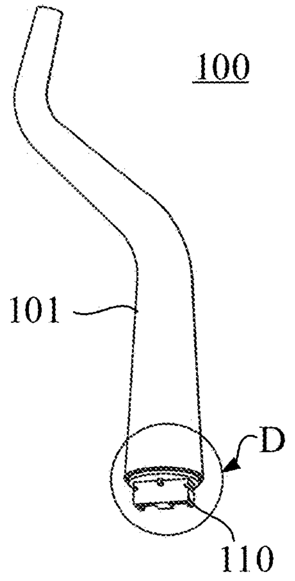
FIG. 10 is a structural schematic diagram of a lamp housing in another embodiment of the present application.
Figure 11:
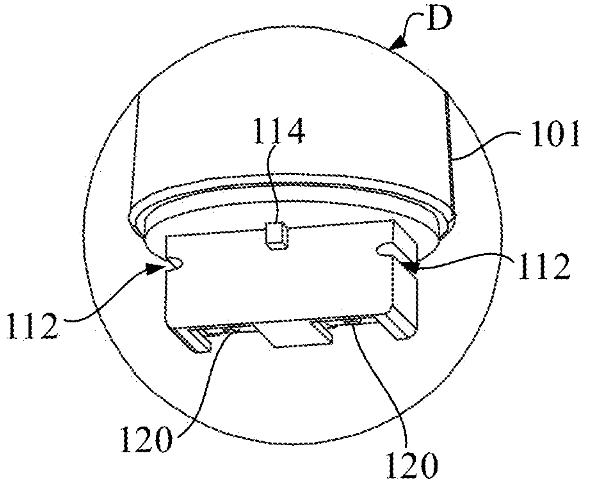
FIG. 11 is an enlarged view of area D of the lamp housing as shown in FIG. 10.
Figure 12:
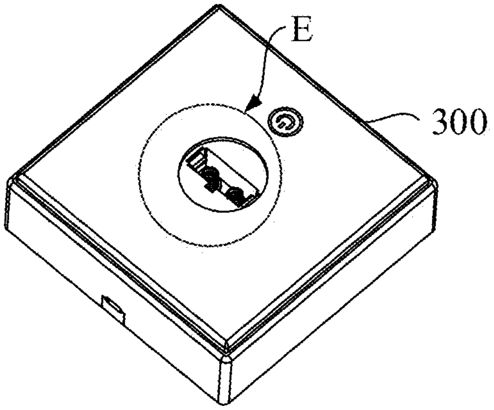
FIG. 12 is a structural schematic diagram of a base in the embodiment as shown in FIG. 10.
Figure 13:
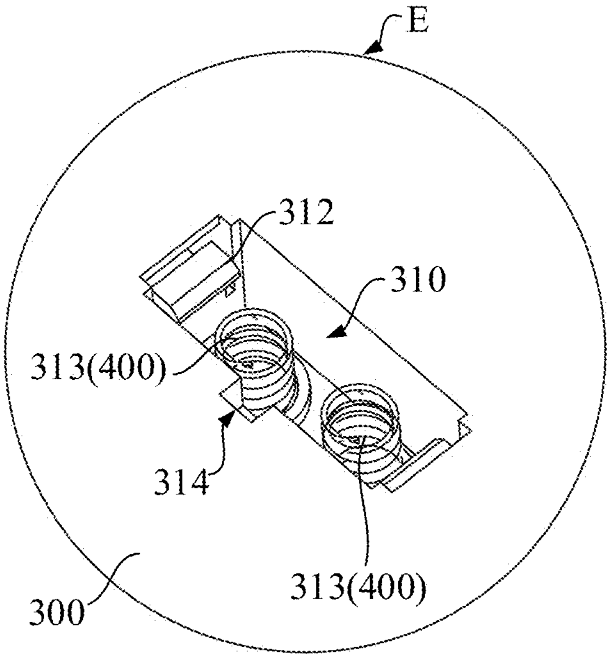
FIG. 13 is an enlarged view of area E of the base as shown in FIG. 12.
Figure 14:
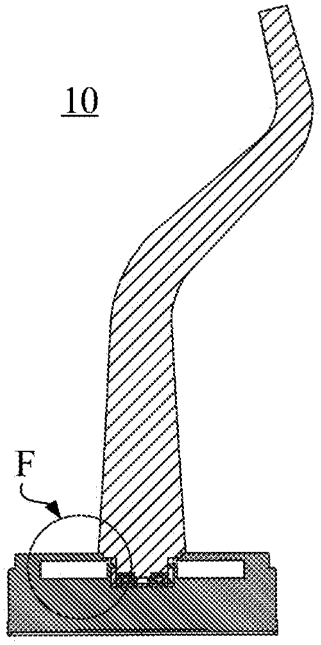
FIG. 14 is a sectional view of a tree lamp in the embodiment as shown in FIG. 10.
Figure 15:
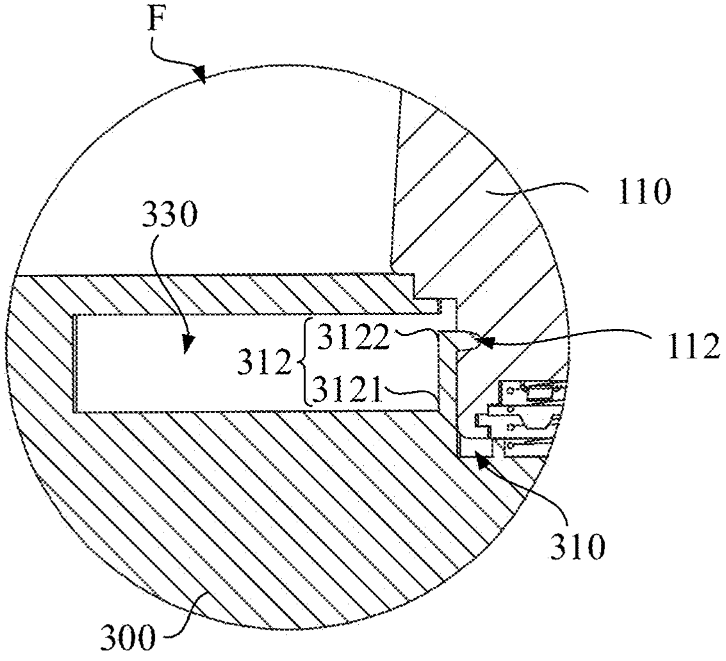
FIG. 15 is an enlarged view of area F in the sectional view as shown in FIG. 14.

Reference is made to FIG. 10 to FIG. 15, FIG. 10 is a structural schematic diagram of a lamp housing in another embodiment of the present application, FIG. 11 is an enlarged view of area D of the lamp housing as shown in FIG. 10, FIG. 12 is a structural schematic diagram of a base in the embodiment as shown in FIG. 10, FIG. 13 is an enlarged view of area E of the base as shown in FIG. 12, FIG. 14 is a sectional view of a tree lamp in the embodiment as shown in FIG. 10, and FIG. 15 is an enlarged view of area F in the sectional view as shown in FIG. 14.

In another embodiment, snap-fitting grooves 112 are formed in the outer wall of the mounting portion 110, and snap-fitting blocks 312 fitted with the snap-fitting grooves 112 are formed in the inner wall of the mounting recess 310. FIG. 14 and FIG. 15 show that the mounting portion 110 is capable of being inserted into the mounting recess 310, and at least parts of the snap-fitting blocks 312 are embedded in the snap-fitting grooves 112. It is understandable that in other embodiments, positions of the snap-fitting blocks 312 and positions of the snap-fitting grooves 112 can be exchanged, that is, the snap-fitting grooves 112 are provided in the inner wall of the mounting recess 110, and the corresponding snap-fitting blocks 312 are provided on the outer wall of the mounting portion 310.

Specifically, there are two snap-fitting blocks 312, and the two snap-fitting blocks 312 are respectively located on two opposite sides of the mounting recess 310; and there are two snap-fitting grooves 112, and the two snap-fitting blocks 312 correspond to the two snap-fitting grooves 112 on a one-to-one basis. The snap-fitting blocks 312 are provided on inner walls of the two opposite sides of the mounting recess 310 at the same time, so that the stress stability of the mounting portion 110 can be improved, the connection between the mounting portion 110 and the mounting recess 310 can be firmer, and loosening caused by warping of one side of the mounting portion 110 can be avoided.

Further, FIG. 15 shows that each of the snap-fitting blocks 312 includes a fixed end 3121 and a rotating end 3122 which are opposite to each other, and the fixed end 3121 is connected to the inner wall of the mounting recess 310; and the base 300 is provided with avoiding spaces 330 for the snap-fitting blocks 312 to rotate, and each of the avoiding spaces 330 is located on one side of the snap-fitting block 312 away from the mounting recess 310. In a process of mounting the mounting portion 110 in the mounting recess 310, the bottom of the mounting portion 110 extrudes the rotating ends 3122 to enable the rotating ends 3122 to be elastically deformed and rotate in a direction away from the mounting portion 110, the mounting portion 110 is continuously inserted into the mounting recess 310 until the rotating ends 3122 are aligned to the snap-fitting grooves 112, and at least parts of the rotating ends 3122 are embedded in the snap-fitting grooves 112.

Figure 16:
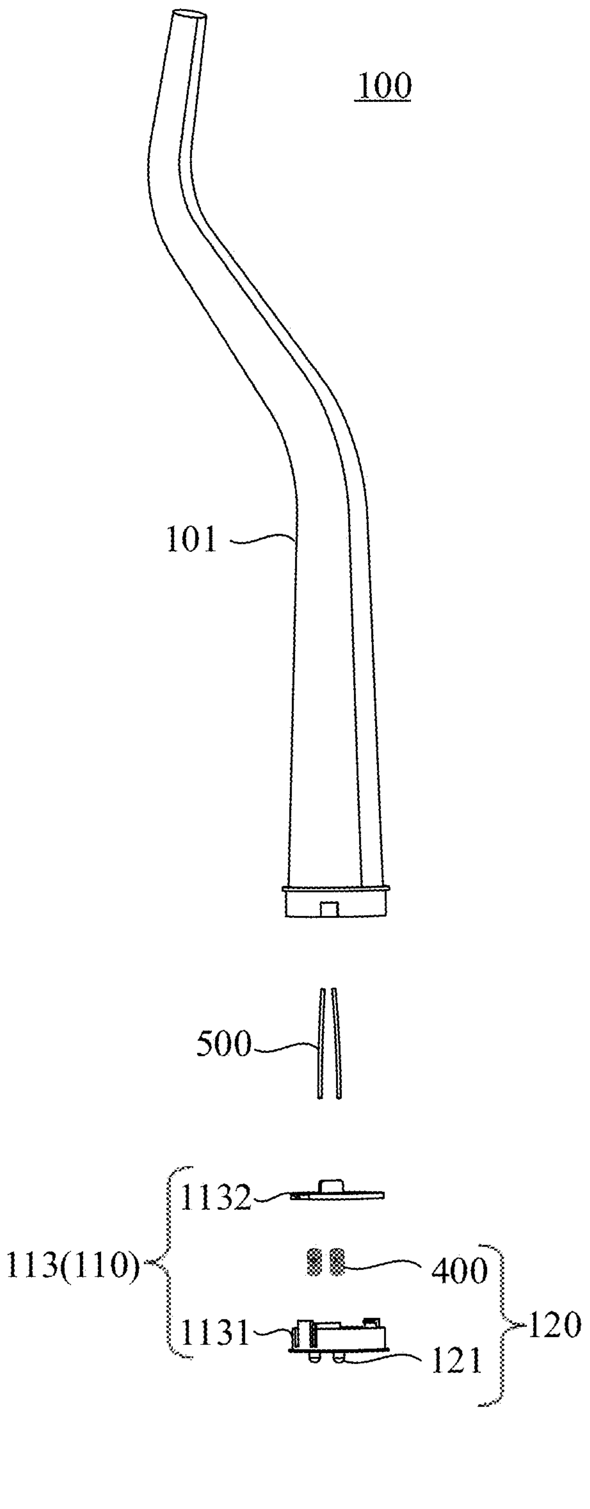
FIG. 16 is an exploded structural diagram of a lamp housing in an embodiment of the present application.

Reference is made to FIG. 16, the lamp housing 100 includes a housing body 101, the mounting portion 110 is provided at a lower end of the housing body 101, and the power connection contacts 120 are provided in an inner cavity of the mounting portion 110. It is understandable that in some embodiments, the power connection contacts 120 can be provided at other positions of the housing body 101 instead of being provided on the mounting portion 110.

Figure 17:
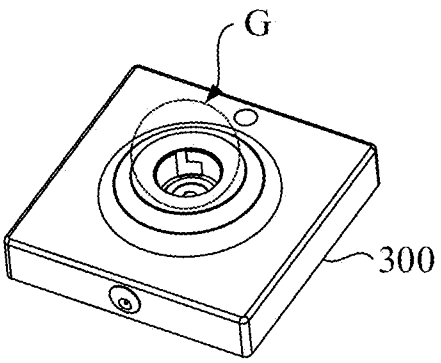
FIG. 17 is a structural schematic diagram of a base in the embodiment as shown in FIG. 16.
Figure 18:
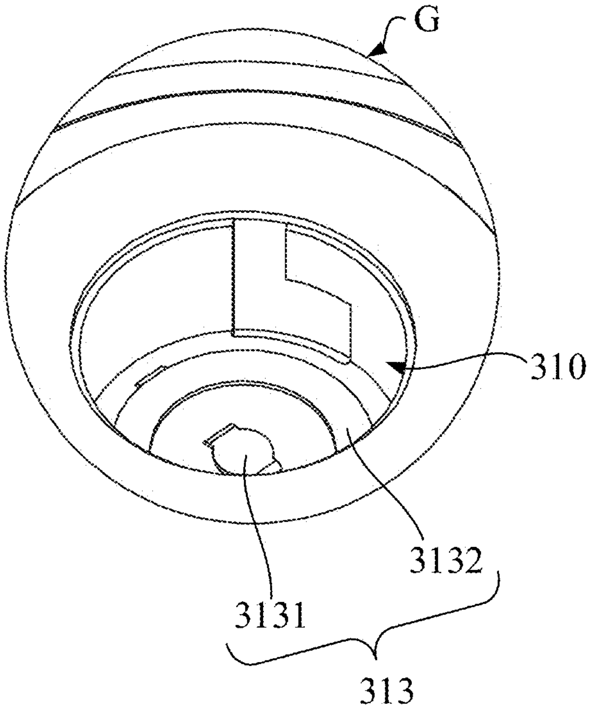
FIG. 18 is an enlarged view of area G of the base as shown in FIG. 17.

Reference is made to FIG. 16 to FIG. 18, in an embodiment, each of the power connection contacts 120 includes contact pins 121 and the elastic member 400, one end of each of the contact pins 121 is exposed out of the mounting portion 110, and two opposite ends of the elastic member 400 are respectively connected to the contact pins 121 and the mounting portion 110. In the process of mounting the mounting portion 110 in the mounting recess 310, the contact pins 121 are in contact with the electrically-conductive structures 313, then the mounting portion 110 is continuously inserted into the mounting recess 310, the elastic members 400 in the power connection contacts 120 are compressed and accumulate elastic forces, and finally, the mounting portion 110 is fixed in the mounting recess 310.

Specifically, there are two contact pins 121, one of the two contact pins 121 is located at the center of the mounting portion 110, and the other one deviates from the center of the mounting portion 110. FIG. 18 shows that each of the electrically-conductive structure 313 includes a first electrically-conductive sheet 3131 and a second electrically-conductive sheet 3132, the first electrically-conductive sheet 3131 and the second electrically-conductive sheet 3132 are configured to be in contact with the different contact pins 121, the first electrically-conductive sheet 3131 is a round electrically-conductive sheet, the second electrically-conductive sheet 3132 is an annular electrically-conductive sheet and surrounds the first electrically-conductive sheet 3131, and there is a gap between the first electrically-conductive sheet 3131 and the second electrically-conductive sheet 3132.

It is understandable that compared with providing only one contact pin 121 to be in contact with one electrically-conductive sheet, providing the two contact pins 121 to be in corresponding contact with the two electrically-conductive sheets on a one-to-one basis can reduce the impedance, thereby reducing the energy consumption of the tree lamp 10.

In addition, the first electrically-conductive sheet 3131 and the second electrically-conductive sheet 3132 are the round electrically-conductive sheet and the annular electrically-conductive sheet respectively, so that in the process of rotating the mounting portion 110 relative to the mounting recess 310, the contact pins 121 and the corresponding electrically-conductive sheets can always be kept opposite each other up and down without staggering, and the contact relationship between the contact pins 121 and the corresponding electrically-conductive sheets will not be affected by the rotation angle of the mounting portion 110. The first electrically-conductive sheet 3131 is round, so that the area of the first electrically-conductive sheet 3131 can be set relatively small, which is more beneficial to reasonable arrangement of the electrically-conductive sheet in a limited space.

Specifically, the mounting portion 110 is of a sleeve structure 113, and the sleeve structure 113 is detachably sleeved at the lower end of the housing body 101. The light-emitting body 200 needs to be electrically connected to the power connection contacts 120 by means of the wires 500 or other electrically-conductive manners, and during assembly of the lamp housing 100, the power connection contacts 120 need to be connected to the wires 500, so that the mounting portion 110 is configured to be detachably connected to the housing body 101, the wires 500 can be relatively easily connected, and the assembly is facilitated. In addition, the power connection contact 120 or the light-emitting body 200 is convenient to maintain or replace when being damaged. The sleeve structure 113 can be detachably connected to the lower end of the housing body 101 in a manner such as snap-fitting or threaded connection.

Further, the sleeve structure 113 includes a sleeve body 1131 and a sleeve cover 1132, the sleeve cover 1132 is detachably connected to the sleeve body 1131, the sleeve cover 1132 and the sleeve body 1131 enclose the inner cavity of the mounting portion 110, and the contact pins 121 and the elastic members 400 are provided in the inner cavity of the mounting portion 110. The sleeve cover 1132 and the sleeve body 1131 are detachable, so that the power connection contacts 120 are more convenient to assemble and maintain. The sleeve body 1131 can be detachably connected to the sleeve cover 1132 in a manner such as snap-fitting or threaded connection.

In an embodiment, reference is made to FIG. 11 and FIG. 13, the outer wall of the mounting portion 110 is provided with a second protrusion 114, a guide groove 314 fitted with the second protrusion 114 is formed in the inner wall of the mounting recess 310, and an opening of the guide groove 314 is in communication with the top surface of the base 300. In the process of mounting the mounting portion 110 in the mounting recess 310, the second protrusion 114 is first aligned to the guide groove 314, and then the second protrusion 114 is inserted into the guide groove 314 along the opening of the guide groove 314, thereby driving the mounting portion 110 to enter the mounting recess 310.

Specifically, there are one second protrusion 114 and one guide groove 314. That is, only when the second protrusion 114 is aligned to the guide groove 314, the mounting portion 110 can be inserted into the mounting recess 310, when the mounting portion 110 is mounted reversely, the second protrusion 114 and the guide groove 314 are respectively located on the two opposite sides of the mounting portion 110, the second protrusion 114 cannot be aligned to the guide groove 314, and then the mounting portion 110 cannot be inserted into the mounting recess 310. Therefore, the mounting portion 110 can only be mounted in the mounting recess 310 in a specific direction (that is, an extension direction of the guide groove 314), thereby avoiding a wrong mounting direction when the lamp housing 100 is mounted on the base 300.

In an embodiment, reference is made to FIG. 5 and FIG. 9, cambered surfaces 115 are formed at the bottom of the mounting portion 110, an acute angle is formed between a tangent of each of the cambered surfaces 115 and an axis of the mounting portion 110, and a distance between each of the cambered surfaces 115 and the axis of the mounting portion 110 gradually decreases in a mounting direction of the mounting portion 110. In the process of mounting the mounting portion 110 in the mounting recess 310, the cambered surfaces 115 play a role in guiding the bottom of the mounting portion 110 to enter the mounting recess 310. It is understandable that the mounting direction of the mounting portion 110 refers to a direction in which the mounting portion 110 enters the mounting recess 310 from an opening of the mounting recess 310.

Specifically, there are two cambered surfaces 115, the two cambered surfaces 115 are respectively located on two opposite sides of the mounting portion 110, and providing the cambered surfaces 115 on the two sides is more beneficial to mounting of the mounting portion 110. It is understandable that in other embodiments, the manufacturer can set the cambered surfaces 115 in other numbers or set no cambered surfaces 115 according to requirements.

Figure 19:
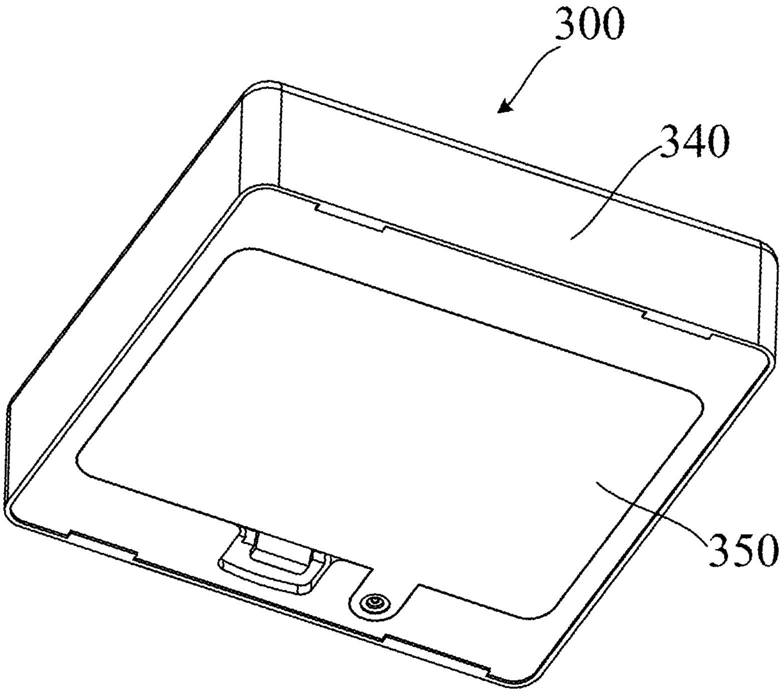
FIG. 19 is a structural schematic diagram of a base at another viewing angle.

In some embodiments, reference is made to FIG. 19, the base 300 includes an upper housing 340 and a lower cover plate 350, the lower cover plate 350 is detachably connected to the upper housing 340, the upper housing 340 and the lower cover plate 350 enclose a mounting cavity, and the power supply unit 320 is located in the mounting cavity. Specifically, the lower cover plate 350 can be connected to the upper housing 340 by means of screw connection and snap-fitting. Through such arrangement, the lower cover plate 350 can be detached from the upper housing 340, thereby facilitating maintenance or replacement of the power supply unit 320.

Specifically, reference is made to FIG. 1 and FIG. 2, the power supply unit 320 includes a battery 321 and a circuit board 322, and the electrically-conductive structures 313 and the battery 321 are electrically connected to the circuit board 322. The circuit board 322 is provided with a circuit, and the battery 321 and the electrically-conductive structures 313 are connected into the circuit, so that the battery 321 can supply power to the light-emitting body 200. Of course, in other embodiments, power can also be supplied to the circuit board 322 and the light-emitting body 200 by means of an external power source.

In an embodiment, the tree lamp 10 further includes a control switch 600, where the control switch 600 is electrically connected to the circuit board 322, and the control switch 600 is connected into the circuit where the electrically-conductive structures 313 and the battery 321 are located to control the connection or disconnection of the circuit. Thus, turning-on and turning-off of the light-emitting body 200 and the brightness of the light-emitting body 200 can also be controlled by means of the control switch 600.

In the description of this embodiment, unless otherwise specified, "a plurality of" means two or more. The above content is only the particular embodiments of the present application, but the scope of protection of the present application is not limited to these embodiments. Any modification or replacement within the scope of technologies disclosed in the present application should be included in the scope of protection of the present application. Therefore, the scope of protection of the present application should be subject to the scope of protection of the claims.

What is claimed is:

1. A tree lamp, comprising:

a lamp housing, wherein the lamp housing is configured to have a tree shape, a mounting portion is formed at a lower end of the lamp housing, and the lower end of the lamp housing is further provided with power connection contacts, wherein the mounting portion is in a circular shape;

a light-emitting body, wherein the light-emitting body is provided on the lamp housing, and the light-emitting body is electrically connected to the power connection contacts; and a base, wherein a power supply unit is provided inside the base, a mounting recess is formed in a top surface of the base, electrically-conductive structures are provided inside the mounting recess, and the electrically-conductive structures are electrically connected to the power supply unit, wherein the mounting recess is in a circular shape; and wherein the lamp housing comprises a housing body, the mounting portion is provided at a lower end of the housing body, and the power connection contacts are provided in an inner cavity of the mounting portion; and each of the power connection contacts comprises contact pins and an elastic member, one end of each of the contact pins is exposed out of the mounting portion, two opposite ends of the elastic member are respectively connected to the contact pins and the mounting portion, and when the mounting portion is mounted in the mounting recess, the mounting portion is capable of rotating relative to the mounting recess, the power connection contacts are in contact with the electrically-conductive structures, and elastic members are compressed;

wherein there are two contact pins, one of the two contact pins is located at the center of the mounting portion, and the other one deviates from the center of the mounting portion; and each of the electrically-conductive structures comprises a first electrically-conductive sheet and a second electrically-conductive sheet, the first electrically-conductive sheet and the second electrically-conductive sheet are configured to be in contact with the different contact pins, the first electrically-conductive sheet is a round electrically-conductive sheet, the second electrically-conductive sheet is an annular electrically-conductive sheet and surrounds the first electrically-conductive sheet, and there is a gap between the first electrically-conductive sheet and the second electrically-conductive sheet.

2. The tree lamp according to claim 1, wherein the mounting portion is of a sleeve structure, and the sleeve structure is detachably sleeved at the lower end of the housing body.

3. The tree lamp according to claim 2, wherein the sleeve structure comprises a sleeve body and a sleeve cover, the sleeve cover is detachably connected to the sleeve body, and the sleeve cover and the sleeve body enclose the inner cavity of the mounting portion.

4. The tree lamp according to claim 1, wherein the mounting portion is detachably connected to the mounting recess.

5. The tree lamp according to claim 4, wherein first protrusions are formed on an inner wall of the mounting recess, and limiting grooves fitted with the first protrusions are formed in an outer wall of the mounting portion; and the mounting portion is capable of being inserted into the mounting recess, and at least parts of the first protrusions are embedded in the limiting grooves.

6. The tree lamp according to claim 5, wherein there are two first protrusions, and the two first protrusions are respectively located on two opposite sides of the mounting portion; and there are two limiting grooves.

7. The tree lamp according to claim 4, wherein snap-fitting grooves are formed in an outer wall of the mounting portion, and snap-fitting blocks fitted with the snap-fitting grooves are formed in an inner wall of the mounting recess; and the mounting portion is capable of being inserted into the mounting recess, and at least parts of the snap-fitting blocks are embedded in the snap-fitting grooves.

8. The tree lamp according to claim 7, wherein there are two snap-fitting blocks, and the two snap-fitting blocks are respectively located on two opposite sides of the mounting recess; and there are two snap-fitting grooves.

9. The tree lamp according to claim 7, wherein each of the snap-fitting blocks comprises a fixed end and a rotating end which are opposite to each other, and the fixed end is connected to the inner wall of the mounting recess; the base is provided with avoiding spaces for the rotating ends to rotate, and each of the avoiding spaces is located on one side of the snap-fitting block away from the mounting recess; and in a process of mounting the mounting portion in the mounting recess, the bottom of the mounting portion extrudes the rotating ends to enable the rotating ends to be elastically deformed and rotate in a direction away from the mounting portion, the mounting portion is continuously inserted into the mounting recess until the rotating ends are aligned to the snap-fitting grooves, and at least parts of the rotating ends are embedded in the snap-fitting grooves.

10. The tree lamp according to claim 1, wherein an outer wall of the mounting portion is provided with a second protrusion, a guide groove fitted with the second protrusion is formed in an inner wall of the mounting recess, and an opening of the guide groove is in communication with the top surface of the base.

11. The tree lamp according to claim 10, wherein there are one second protrusion and one guide groove.

12. The tree lamp according to claim 1, wherein cambered surfaces are formed at the bottom of the mounting portion, an acute angle is formed between a tangent of each of the cambered surfaces and an axis of the mounting portion, and a distance between each of the cambered surfaces and the axis of the mounting portion gradually decreases in a mounting direction of the mounting portion.

13. The tree lamp according to claim 12, wherein there are two cambered surfaces, and the two cambered surfaces are respectively located on two opposite sides of the mounting portion.

14. The tree lamp according to claim 1, wherein each of the elastic members is a spring.

15. The tree lamp according to claim 1, wherein the power supply unit comprises a battery and a circuit board, and the electrically-conductive structures and the battery are electrically connected to the circuit board.

16. The tree lamp according to claim 1, wherein the base comprises an upper housing and a lower cover plate, the lower cover plate is detachably connected to the upper housing, the upper housing and the lower cover plate enclose a mounting cavity, and the power supply unit is located in the mounting cavity.

* * * * *